(12) United States Patent
Morse et al.

(10) Patent No.: US 11,451,027 B2
(45) Date of Patent: Sep. 20, 2022

(54) PRESS COUPLER FOR ELECTRICAL CONDUIT

(71) Applicant: EATON INTELLIGENT POWER LIMITED, Dublin (IE)

(72) Inventors: Bradford Morse, Syracuse, NY (US); Joseph Platt, Baldwinsville, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 659 days.

(21) Appl. No.: 16/433,612

(22) Filed: Jun. 6, 2019

(65) Prior Publication Data

US 2019/0379190 A1 Dec. 12, 2019

Related U.S. Application Data

(60) Provisional application No. 62/682,468, filed on Jun. 8, 2018.

(51) Int. Cl.
*H02G 3/06* (2006.01)
*H01R 4/26* (2006.01)
*H01R 4/64* (2006.01)

(52) U.S. Cl.
CPC ............... *H02G 3/06* (2013.01); *H01R 4/26* (2013.01); *H01R 4/643* (2013.01)

(58) Field of Classification Search
CPC ............ H02G 3/06; H01R 4/26; H01R 4/643
USPC ...................................................... 174/68.3
See application file for complete search history.

(56) References Cited

U.S. PATENT DOCUMENTS

| 5,695,224 A * | 12/1997 | Grenier ............... F16L 37/091 285/308 |
| 7,316,429 B2 | 1/2008 | Viegener |
| 7,862,089 B2 * | 1/2011 | Crompton ............ F16L 19/08 285/39 |
| 8,480,134 B2 * | 7/2013 | Crompton .......... F16L 37/0915 29/521 |
| 8,517,431 B2 * | 8/2013 | Arning ................ F16L 13/147 285/256 |
| 8,586,881 B1 | 11/2013 | Shemtov |
| 9,541,228 B2 * | 1/2017 | Bobo ................. F16L 37/0915 |
| 9,551,445 B2 | 1/2017 | Morse et al. |
| 9,851,028 B2 * | 12/2017 | Stout .................... F16L 37/091 |
| 10,180,202 B2 * | 1/2019 | Crompton .......... F16L 37/0915 |
| 10,374,333 B2 * | 8/2019 | Le Quere ................ H01R 4/60 |
| 10,400,929 B2 * | 9/2019 | Crompton .......... F16L 37/0915 |
| 2002/0185868 A1 * | 12/2002 | Snyder, Sr. .......... F16L 37/091 285/317 |
| 2007/0075542 A1 * | 4/2007 | Glaze .................... F16L 25/01 285/322 |
| 2011/0049875 A1 * | 3/2011 | Stults ................... F16L 13/142 285/345 |
| 2012/0284994 A1 * | 11/2012 | Crompton .......... F16L 37/0915 285/308 |
| 2016/0161038 A1 * | 6/2016 | Crompton ............ F16L 37/091 285/340 |
| 2017/0082231 A1 * | 3/2017 | Crompton .......... F16L 37/0915 |

(Continued)

*Primary Examiner* — Timothy J Thompson
*Assistant Examiner* — Michael F McAllister
(74) *Attorney, Agent, or Firm* — Pearne & Gordon LLP

(57) ABSTRACT

A press coupler is provided for use with a pipe or conduit system. The press coupler facilitates increased ease and speed of assembly of pipe and conduit installations and can be used with both threaded and non-threaded connections.

13 Claims, 6 Drawing Sheets

(56) References Cited

U.S. PATENT DOCUMENTS

2019/0067922 A1* 2/2019 Platt ..................... F16L 37/091
2019/0093807 A1* 3/2019 Crompton ............... F16L 19/08

* cited by examiner

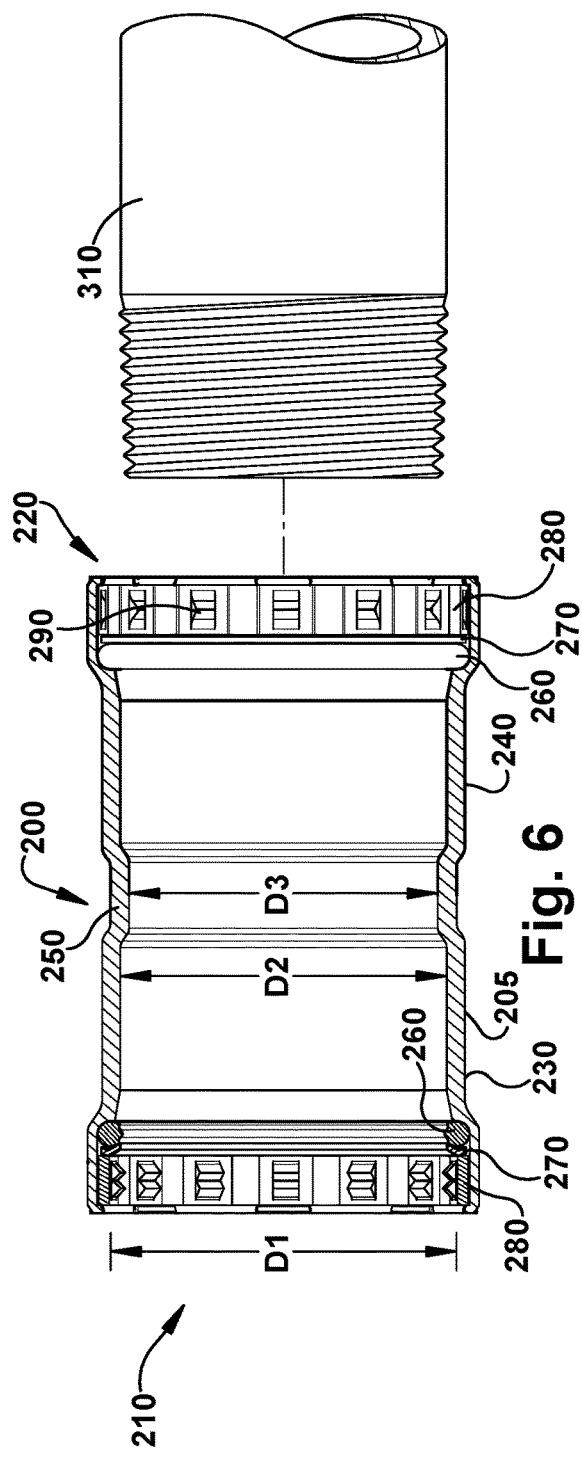
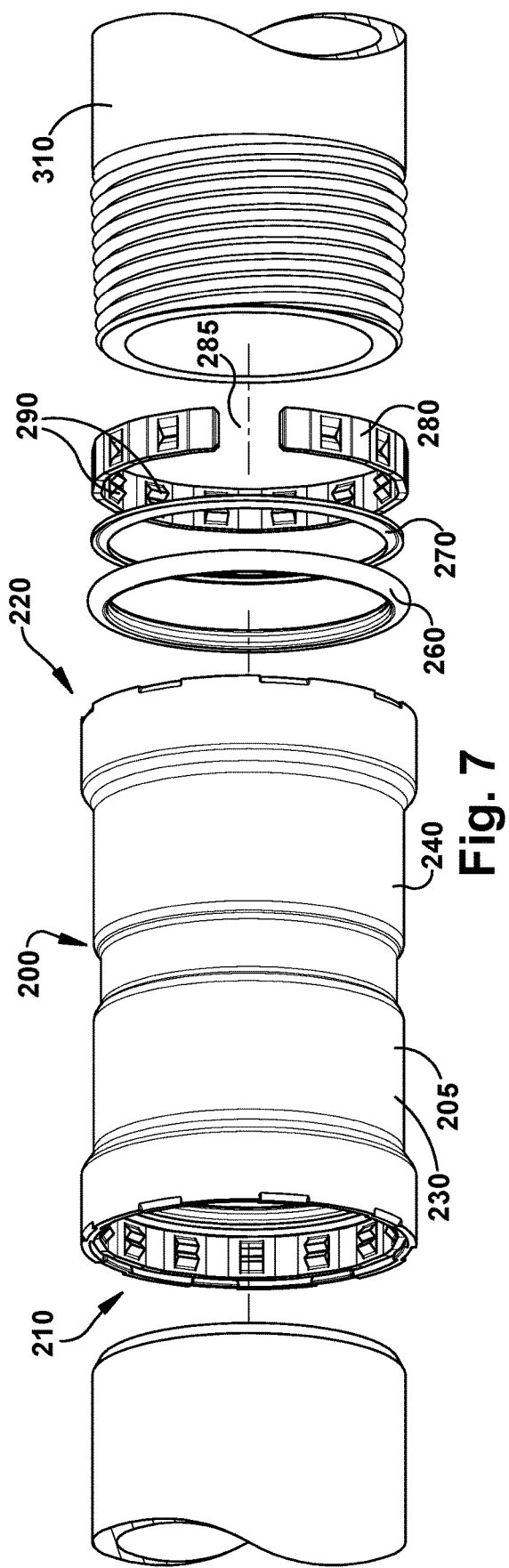

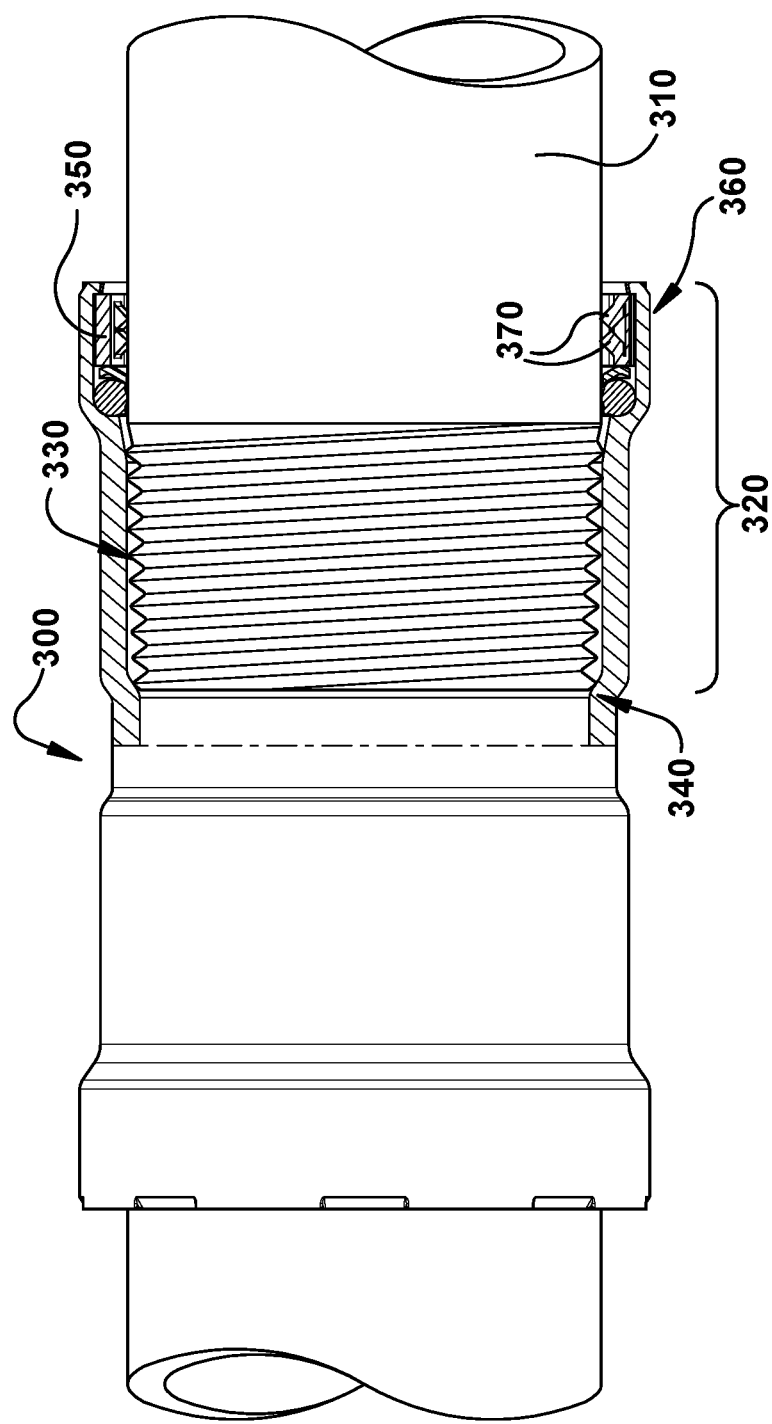

PRESS COUPLER FOR ELECTRICAL CONDUIT

FIELD OF THE INVENTION

The present application relates to electrical conduit systems, and more specifically, to a press fit coupling for an electrical conduit.

BACKGROUND OF THE INVENTION

Electrical conduit piping, also referred to as enclosed raceways, are used to carry electrical wiring, or cables, for power and/or communication. These enclosed raceways are often part of a large and broad-reaching electrical system, such as in an industrial facility, a commercial building, or a power plant, which have a large number of electrical cables throughout. In some locations, where a relatively large number of cables are needed in a common area, cables are laid in cable trays. In other locations, such as where specific electrical devices are located, a relatively small number of cables are run through an enclosed raceway within a larger enclosed raceway system. The enclosed raceways provide protection to the electrical wiring from the environment, such as from impact, moisture, and chemical vapors, which can result in a fault condition. The conduit used in the enclosed raceway systems are made and supplied in fixed lengths. Accordingly, an installer often must perform a number of supplemental tasks to fit the conduit and associated fittings within the system. For example, the installer may have to cut a length of conduit to size, shape a conduit pipe according to a particular curvature, etch mating threads into the conduit, and/or connect the conduit with one or more fittings to accommodate a path of the enclosed raceway.

Conduit pipe can be joined to another component, such as another conduit pipe, connector, junction box, motor control center, switchgear cabinet, control cabinet, etc., using fittings. These fittings provide a connection and/or a change in direction. Currently, the conduit pipe and the other component are joined to the fitting by connecting mating threads. However, if the system is designed improperly or if a conduit has to be cut to size, threads must be etched into the conduit pipe end in order to join the conduit to the fitting. This process is messy (leaving, for example, metal shavings, and oil stains) and time consuming. Moreover, the threading process can decrease the wall thickness of the conduit by up to 55% of the original conduit wall, which can lead to weakness at the joint. In a setting where vibration may occur, having a weakened joint between the conduit and fitting can result in a fatigue failure.

Further, hazardous and/or explosion-proof areas require that thread flame-paths be minimized as their vulnerability to fatigue damage is significant, especially where exposed threads are subject to corrosion. Additionally, when conduit pipes are joined by mating threads in hazardous and/or explosion-proof applications, flame paths formed by the mating threads can be compromised by burrs. Such burrs are often the result of the installer etching mating threads into the conduit. These burrs can also damage electrical wiring as the cables are being pulled through the system.

BRIEF SUMMARY OF THE INVENTION

The present invention provides for an electrical conduit system that utilizes a press coupler for joining pieces of conduit, rather than traditional measures, such as threading.

The invention concerns a press coupler with a first end portion and a second end portion, a first intermediate portion and a second intermediate portion, a central portion, a gasket, and a gripping portion. The gasket of this press coupler is capable of sealing upon a threaded or unthreaded end of a piece of conduit piping which has been inserted into an end of the press coupler and then compressed upon. The central portion of the press coupler provides for a stopping surface such that conduit of the appropriate size cannot pass all the way through the press coupler; however, electrical wiring within the electrical conduit system can. The gripping portion of the press coupler comprises at least one protrusion of varying shape and size, made of a material harder than the conduit, and capable of being compressed around, gripping and deforming the conduit. The press coupler, once compressed around the conduit piping, forms an electrical grounding connection between the conduit, the press coupler, and the at least one projection.

Other aspects and embodiments of the invention disclosed herein will be readily apparent to one of ordinary skill in the art. The scope of this invention is not limited to the attributes or embodiments described. It should be appreciated by those skilled in the art that various modifications are well within the scope and spirit of this disclosure and that equivalents of the elements described are not outside that of which is claimed herein.

BRIEF DESCRIPTION OF THE DRAWINGS

FIG. 6 illustrates an example of a press coupler and a conduit with a threaded end portion.

FIG. 7 illustrates an example of a press coupler, a conduit with a threaded end portion, and a conduit with a non-threaded end portion.

FIG. 8 illustrates an example assembly of a press coupler and a conduit with a threaded end portion.

DETAILED DESCRIPTION OF THE INVENTION

Figure 1:
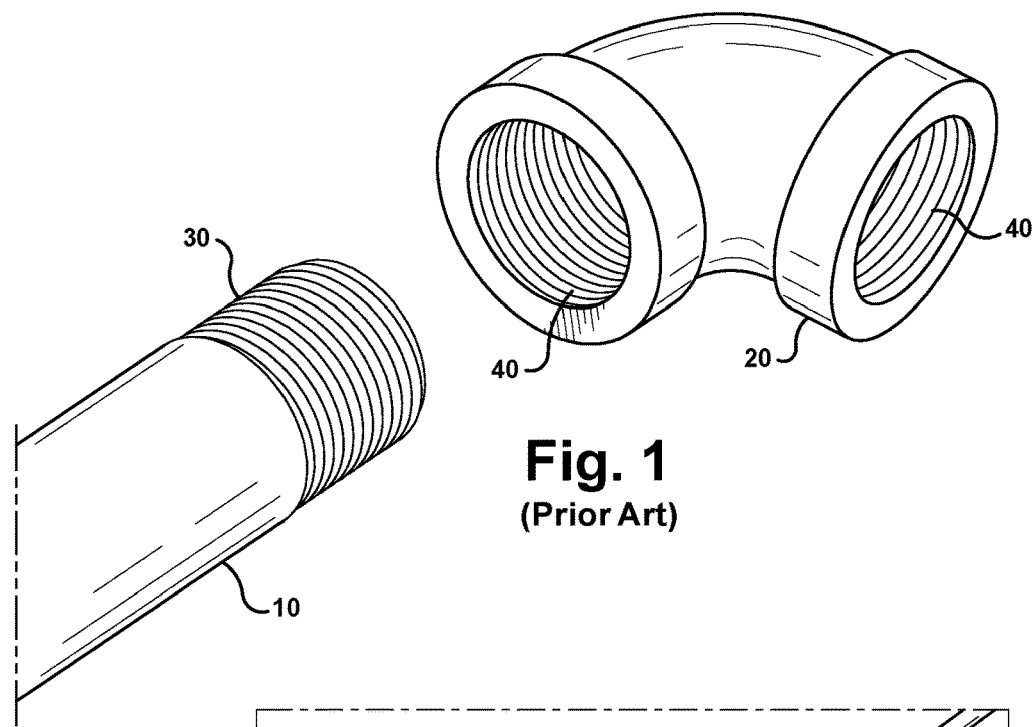
FIG. 1 illustrates a prior art example of a conduit and a fitting.

Example embodiments are described and illustrated herein. These illustrated examples are not intended to be a limitation on the present embodiments. For example, one or more aspects of the system can be utilized in other embodiments and even other types of devices. The embodiments described herein are directed to a coupling system and method for use in electrical conduit systems. However, it is to be appreciated that the present invention can be used in any suitable system to couple any type of pipe or conduit with any type of other device, such as a junction box, drain hub, ground nut, cap, and adapter. Thus, the conduits described herein are not limited to conduits for electrical cables. The enclosed raceways can be rigid and/or flexible, as needed.

As used herein, the term "coupling" (or variations thereof) can be used interchangeably with the term "connecting" (or variations thereof). These words and their variations are intended to describe how example embodiments are physically joined with one or more other components of an electrical conduit system. As described herein, a user can be any person that interacts with example conduit couplers or a portion thereof. Examples of a user may include, but are not limited to, an engineer, an electrician, a maintenance technician, a mechanic, an operator, a consultant, a contractor, a homeowner, and a manufacturer's representative.

The conduit couplers described herein can be physically placed in outdoor environments. In addition, or in the alternative, example conduit couplers can be subject to extreme heat, extreme cold, moisture, humidity, high winds, dust, and other conditions that can cause wear on the conduit couplers or portions thereof. In certain example embodiments, the conduit couplers, including any portions thereof, are made of materials that are designed to maintain a long-term useful life and to perform when required without mechanical failure.

Example conduit couplers described herein, as part of an enclosed raceway system, can be subject to meeting one or more of a number of standards. For example, the National Electric Code ("NEC") sets standards for electrical wiring of an electrical system. As a specific example, the NEC requires that installations of electrical wiring are performed "in a neat and workmanlike manner." To enhance electrical safety, an installer creates enclosed raceways that protect electrical cable from mechanical abuse and provide electrical continuity of the electrical system.

Underwriters Laboratories (UL) tests and approves (in industry terms, "lists") fittings (e.g., conduit, connectors, couplers) for enclosed raceway systems. It is important to use appropriate UL listed fittings for an enclosed raceway, along with good installation workmanship. The American National Standards Institute (ANSI) and the National Electrical Manufacturers Association (NEMA) also publish a number of standards that apply to enclosed raceways. For example, UL 6 Standard for Safety, Rigid Metal Conduit and couplers and ANSI C80.1 for Electrical Rigid Steel Conduit and couplers.

Example embodiments of conduit couplers will be described more fully hereinafter with reference to the accompanying drawings, in which example embodiments of conduit couplers are shown. Conduit couplers may, however, be embodied in many different forms and should not be construed as limited to the example embodiments set forth herein. Rather, these example embodiments are provided so that this disclosure will be thorough and complete, and will fully convey the scope of conduit couplers to those of ordinary skill in the art. Like, but not necessarily the same, elements (also sometimes called modules) in the various figures are denoted by like reference numerals for consistency.

Terms such as "first," "second," "distal," and "proximal" are used merely to distinguish one component (or part of a component or state of a component) from another. Such terms are not meant to denote a preference or a particular orientation. Any feature and/or component shown and/or described in one embodiment (e.g., in a figure) herein can be used in any other embodiment (e.g., in any other figure) herein, even if not expressly shown and/or described in such other embodiment.

FIG. 1 illustrates an example of a conduit 10 and a fitting 20 as currently known in the art. The conduit 10 is a generally hollow pipe for receiving electrical wiring and can be of a variety of diameters, such as ½ inch, 1½ inch, 2 inch, 6 inch, etc. as desired in a particular application. The conduit 10 includes a threaded distal end 30 on the outer surface of the conduit 10. The fitting 20 has mating threads 40 on an inner distal end surface that complement the threads 30 of the conduit 10. Accordingly, in order to couple the conduit 10 to the fitting 20, one of the conduit 10 or the fitting 20 must be spun onto the other of the conduit 10 or the fitting 20 to achieve the proper connection. As noted above, if one or both of the conduit 10 or fitting 20 does not have a threaded distal end, a threading operation must be performed first in order to make the connection. The conduit 10 and the fitting 20 can be made of one or more of a number of suitable metal materials.

Figure 2:
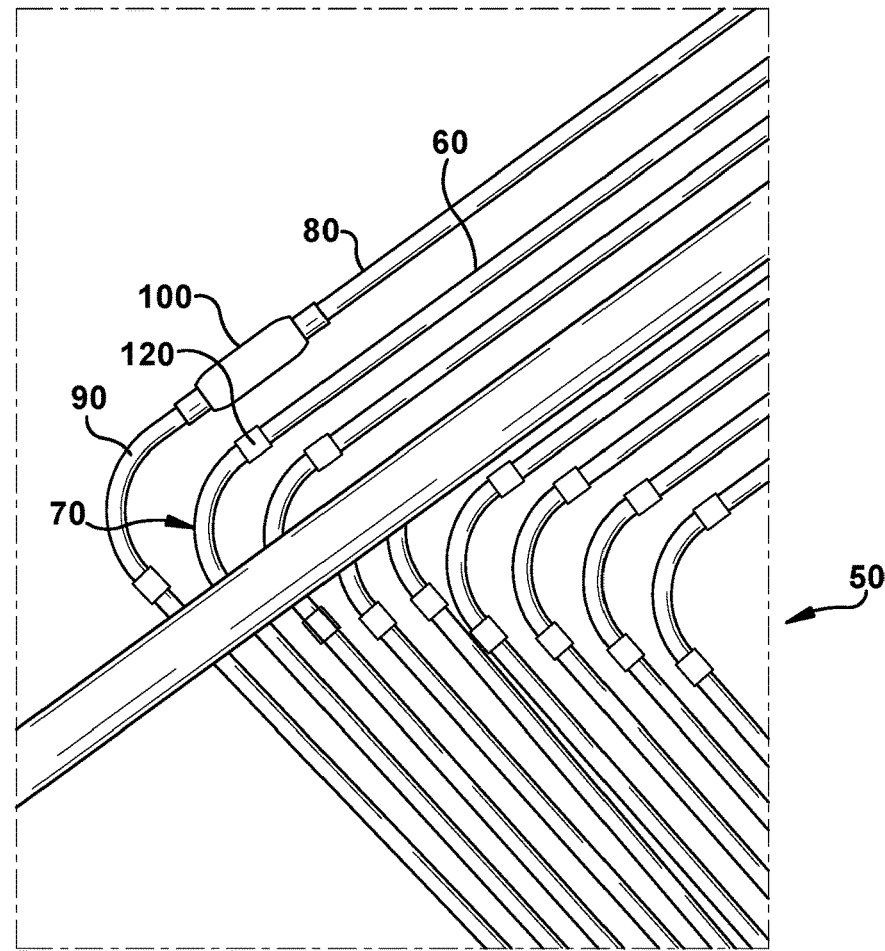
FIG. 2 illustrates a prior art example of an electrical conduit installation using multiple conduits and fittings.
Figure 3:
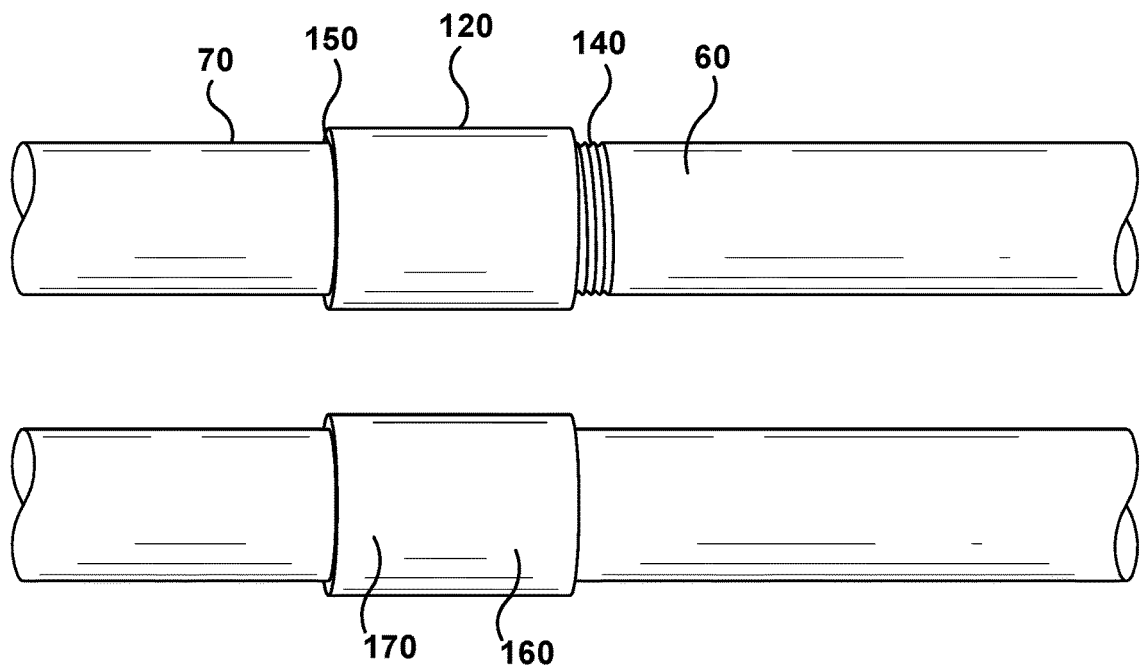
FIG. 3 illustrates a prior art example of a conduit and coupler assembly.

FIGS. 2 and 3 illustrate another example of an electrical conduit system 50 as known in the art. The system 50 includes a rack of conduits, such as conduits 60 and 70 connected by couplers, such as coupler 120. Similar to FIG. 1 each of the conduits 60 and 70 have externally threaded distal ends 140 and 150, as shown in FIG. 3. Likewise, first and second corresponding ends 160, 170 of the coupler 120 are internally threaded. Thus, to properly install the electrical conduit system 50, each of the conduits 60 and 70 must be spun into the coupler 120 until the mating threads of the conduit ends 140 and 150 are sufficiently secured to the first and second ends 160 and 170 of the coupler 120. A strap wrench (not shown) is often used to tighten wrench tight per the electrical code.

Figure 4:
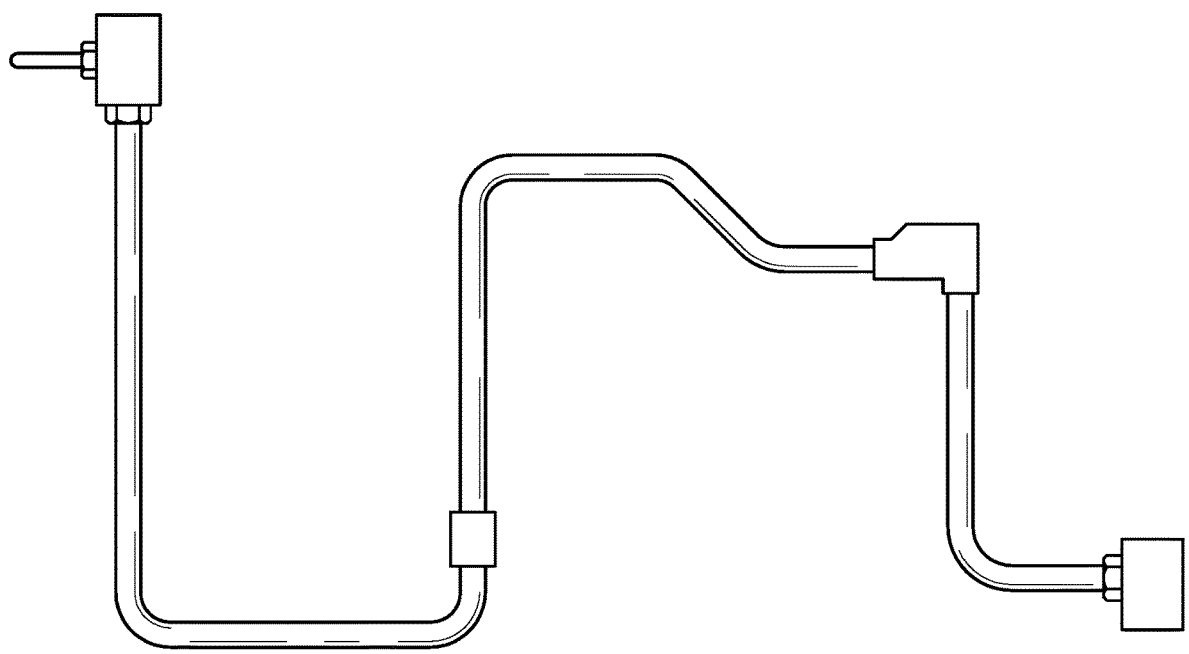
FIG. 4 illustrates an example of a conduit installation having multiple components.
Figure 5:
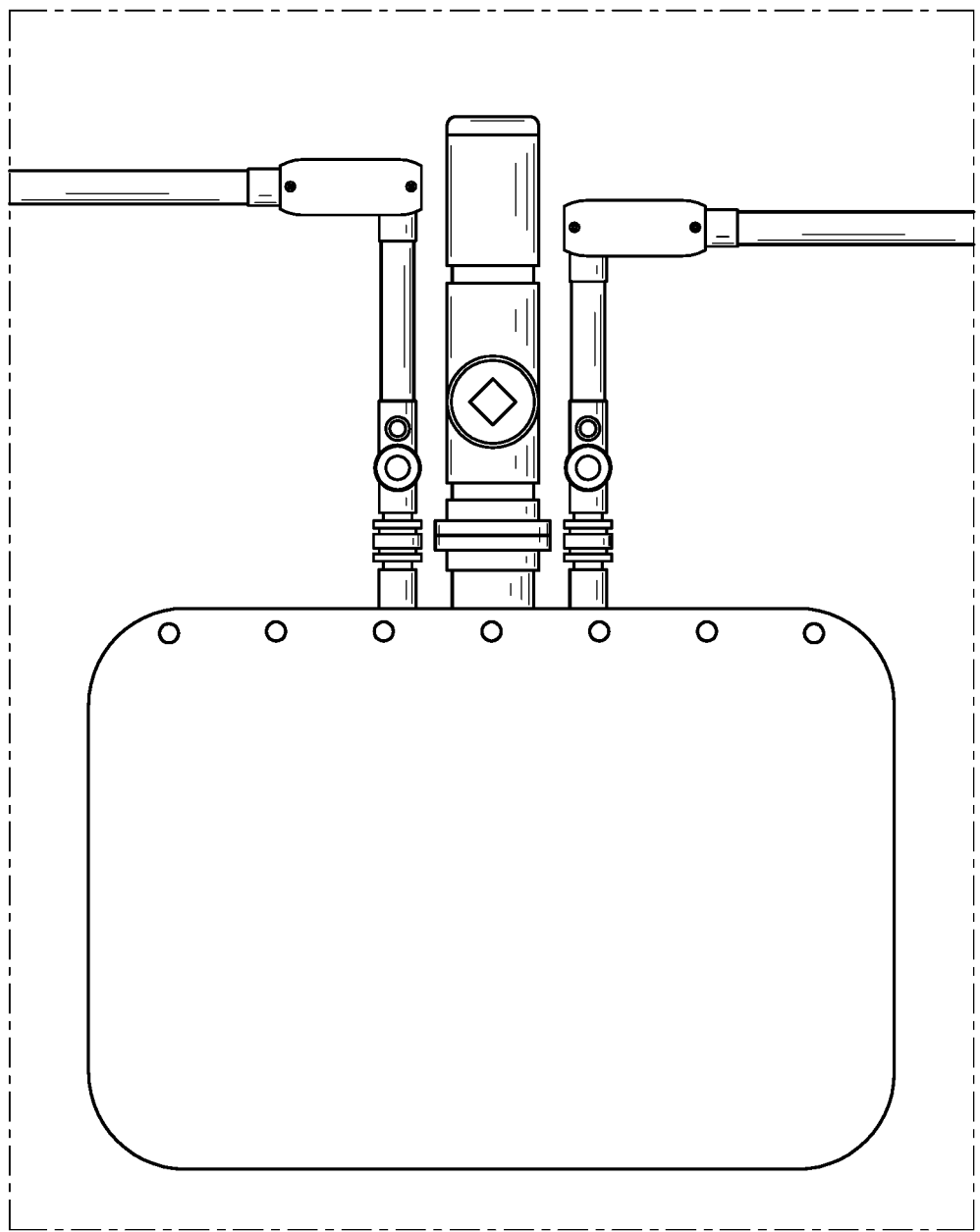
FIG. 5 illustrates an example of a conduit installation having multiple enclosures.

Turning back to FIG. 2, the system 50 can also include a plurality of conduits, such as conduits 80 and 90, coupled to a conduit outlet body, such as conduit outlet body 100. In this example, the conduit outlet body can be a CONDULET™ (CONDULET is a trademark of Cooper Technologies Company of Houston, Tex.). However, it is to be appreciated that any other type of component or enclosure can be secured to the end of one or more conduit pipes, as shown in FIGS. 4 and 5. For example, a conduit pipe can be secured to a connector, a junction box, a motor control center, a switchgear cabinet, and/or a control cabinet. The conduit outlet body 100 can include a removable cover (not shown). This cover can be removed in order to access electrical cables or wiring running through the conduits 80 and 90 as needed. Similar to the examples shown in FIGS. 1 and 3, each of conduits 80 and 90 have externally threaded distal ends. And each of the corresponding ends of the conduit outlet body 100 are internally threaded. Accordingly, in order to properly install the electrical conduit system 50, each of the conduits 80 and 90 much be spun until the mating threads of the conduit ends are sufficiently secured to the outlet body ends.

As electrical conduit systems can be extremely large, heavy, and include hundreds of feet of conduit and components, such as connectors, couplings, bushings, conduit bodies, etc., it is to be appreciated that spinning one component onto another at each connection point can take significant installation time. This is especially true when one component is threaded and a mating component is not threaded. The installer must take additional time to provide a thread onto the unthreaded mating component in order to couple the parts together.

Turning now to FIG. 6, a press coupler 200 is shown in accordance with an example embodiment. The press coupler 200 has a generally hollow cylindrical configuration and includes a body 205 having a first open end portion 210 and a second open end portion 220. Each of the first and second open end portions 210, 220 are configured to receive a distal end of a conduit or other desired component therein. The first and second open end portions 210, 220 have a first inner diameter D1. The press coupler 200 includes first and second intermediate portions 230, 240, each having a second inner diameter D2 that is smaller than first inner diameter D1. The second inner diameter D2 corresponds to an outer diameter of a mating conduit or component 310. Accordingly, a mating conduit or component 310 can be provided through one of the first and second open end portions 210, 220 and into the corresponding intermediate portion 230, 240. A central portion 250 of the press coupler 200 includes a third inner diameter D3. The third inner diameter D3 is smaller than the second inner diameter D2 and is sized to be less than a diameter of a mating conduit or component 310. Accordingly, the central portion 250 of the press coupler 200 functions as a stop for a conduit end or component end that is inserted into the press coupler 200. In other words, an appropriately sized conduit or component cannot pass through the housing from the first open end portion 210 through to the second open end portion 220. However, the third inner diameter D3 is sized large enough such that electrical cables or wiring can be pulled through the pressing coupling 200 from one open end portion 210 through the other open end portion 220.

As can be more clearly seen in the partially exploded view of FIG. 7, coupled to an interior wall or inner diameter of each of the first and second open end portions 210, 220 of the press coupler 200 is a gasket 260, a separation ring 270, and a gripping ring 280. The gasket 260 can be made from an elastomeric material and can be any type of suitable gasket, such as an O-ring, in order to provide a secure fit between the press coupler 200 and the mating conduit or component 310 when an end portion thereof is inserted into one of the first and second open ends 210, 220 of the press coupler 200. The gripping ring 280 is made of a metal material and includes one or more teeth 290 projecting from an inner diameter thereof. The gripping ring 280 can optionally include a break or an open section 285 within its diameter which allows the gripping ring 280 the ability to flex and compress more easily.

The separation ring 270 is optional and can be made of any suitable material, such as metal or plastic and is of a slightly smaller outer diameter than the gasket 260 and the gripping ring 280. For example, the separation ring 270 can be a conventional washer and acts to separate the gasket 260 and the gripping ring 280. The separation ring 270 can be disposed within some or all of the body 205 in a single, continuous piece or in multiple pieces. The separation ring 270 can be made of one or more materials that are rigid or flexible. In certain example embodiments, the separation ring 270 substantially retains its shape, that is, it is not significantly compressed when the first and second open end portions 220 are compressed and deformed. Although only the internal components of second open end portion 220 are shown in an exploded view, it is to be understood that the first open end portion 210 includes similar components within.

The body 205 of the press coupler 200 is made of one or more of a number of materials that make the body 205 malleable. Thus, when a compressive force is applied to the first or second end portion 210, 220 of the body 205, a wall of the first or second end portion 210, 220 becomes compressed and deformed. When this occurs, the components (e.g., the gasket 260, separation ring 270, and gripping ring 280) positioned within the first or second open end portions 210, 220 and the outer surface of the conduits and/or components are affected.

The end portion of the conduit 310 can be threaded or unthreaded, as shown in FIG. 7. The conduit 310 on the right side of the coupler 200 includes a threaded end and the conduit on the left side of the coupler 200 includes an unthreaded end. It is advantageous, when working in the field, to be able to cut a conduit to size without needing the additional step of threading. In addition to the increased installation time and structural weaknesses discussed above, NEC Section 300.6 (A) requires that where corrosion protection is necessary and the conduit is threaded in the field, the thread shall be coated with an approved electrically conductive, corrosion-resistant compound, thereby requiring yet another time consuming step in the installation process.

Turning now to FIG. 8, an assembly of a press coupler 300 and a conduit 310 is illustrated. The conduit 310 is installed by inserting the distal end 330 of the conduit 310 through an open end portion and into a first section 320 of the press coupler 300. The conduit 310 has a threaded outer diameter at its distal end 330. The threaded end 330 is pushed through the first section 320 until it contacts an inner stop portion 340. The length of the first section 320 is such that when the distal end 330 of the conduit 310 contacts the inner stop portion 340, the threads on the conduit 310 have traveled past the gripping ring 350. Thus, the gripping ring 350 is adjacent a non-threaded portion of the conduit 310 and not directly in contact with any of the threads. Positioning the gripping ring 350 adjacent a non-threaded portion of the conduit 310 facilitates improved physical connection, metal to metal contact after pressing, which is important for grounding, as will be discussed below, and protection from water or other environmental ingress.

Figure 9:
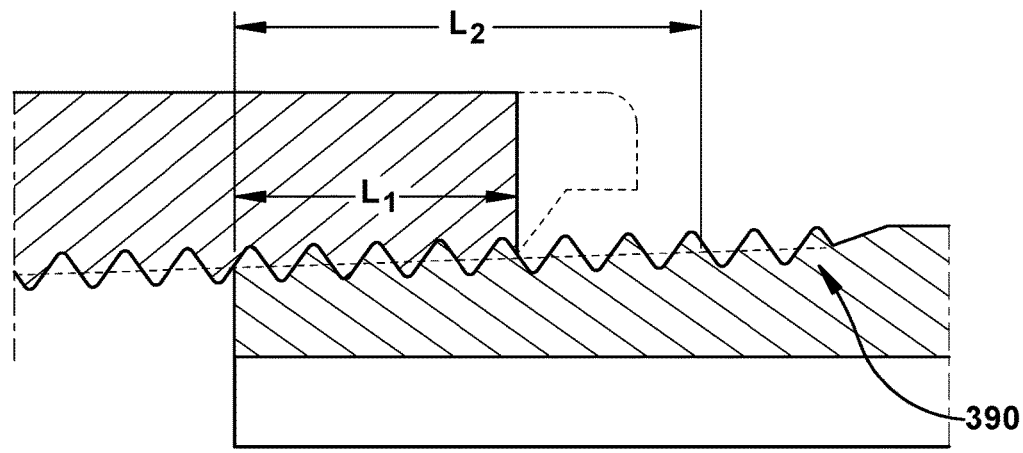
FIG. 9 illustrates an example of an NPT thread.
Figure 10:
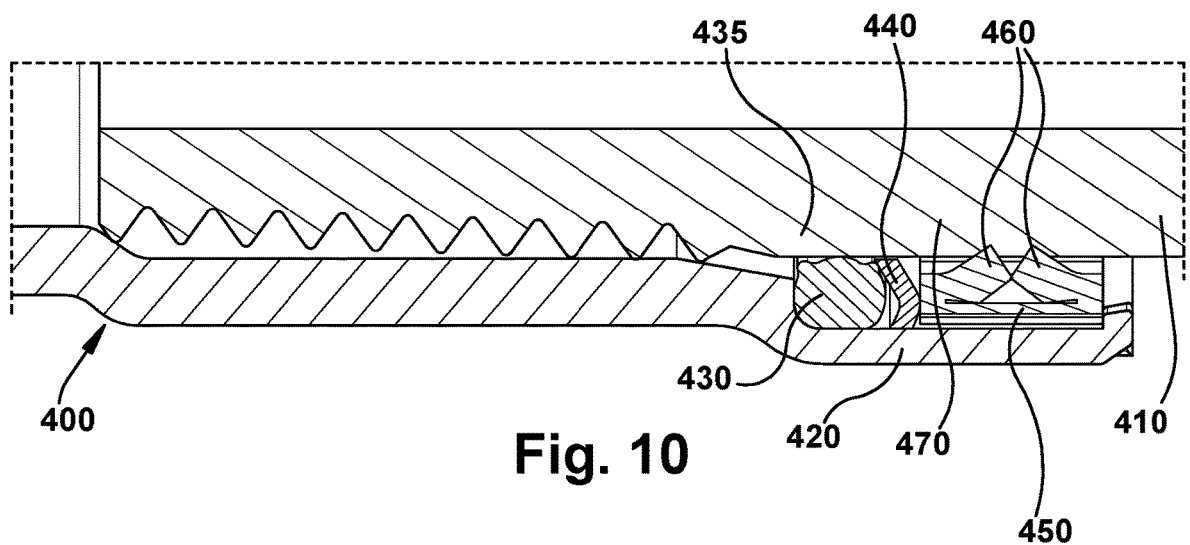
FIG. 10 illustrates an example of a press coupler and a conduit with a threaded end portion assembled and pressed together.

As shown in FIG. 10, which illustrates a conduit and press coupler assembly after a pressing operation, a gasket 430 within a press coupler 400 can be aligned with vanishing threads on the conduit 410 and still maintain a proper seal in the system and provide the required strength between the press coupler 400 and conduit 410. Vanishing threads can be better understood by FIG. 9. This figure illustrates a threaded connection. Length L1 illustrates a hand-tight engagement of NPT threads, for example and length L2 represents the effective length of the NPT thread. Beyond length L2 are the vanishing threads 390. The vanishing threads 390 are created from a chamfer on a die that forms the threads but are not effective in sealing or mating with a corresponding threaded connection.

Turning back to FIG. 8, once the conduit 310 is in position within the press coupler 300, the end portion 360 of the press coupler 300 is compressed and deformed, such that the teeth 370 of the gripping ring 350 become at least partially embedded into the wall of the conduit 310. When this occurs, the teeth 370, and thus, the gripping ring 350 maintains the conduit 310 in a fixed position relative to the press coupler 300. The gripping ring 350 can include a single tooth disposed over some or all of the inner perimeter of the gripping ring 350. Alternatively, as shown in the illustrated examples, the gripping ring 350 can include multiple teeth or projections 370 disposed continuously, regularly, randomly, and/or in some other pattern around an inner perimeter of the gripping ring 350. The teeth 370 can be made of one or more of a number of materials having a hardness value that is greater than the material hardness of the conduit 310. In this way, the press coupler 300 can effectively deform at least a portion of the conduit 310 in order to permanently couple the components together. Deformation of the conduit 310 includes penetration by the teeth 370 of the gripping ring 350 into the conduit wall. In some cases, the teeth 370 and the gripping ring 350 are made of the same material or mixture of materials. If there are multiple teeth or multiple gripping rings, each can be made of the same material or mixture of materials compared to the rest of the teeth or gripping rings.

The cross-sectional shape of the gripping ring 350 (in a normal or uncompressed state) can be one or more of a number of shapes, including but not limited to circular, as shown in the present examples, oval, square, rectangular, triangular, and octagonal. The inner diameter of the gripping ring 350, including the projections or teeth 370, can be equal to or different than (in this case, less than) the outer diameter of the conduit 310 or component threads 330. Accordingly, the gripping ring 350 does not impede the insertion of the conduit 310 into the end portion 360.

FIG. 10 illustrates an enlarged sectional view of a press coupler 400 and conduit 410 assembly after a compressive force has been applied to an outer diameter of the press coupler 400. A press tool (not shown) can be used to make this connection. The press tool can be one or more of a number of devices. The tool can be an off-the-shelf product or a custom-made product that is specifically designed for the press coupler 400. The tool can apply the compressive force at one location along the outer perimeter of the press coupler 400, at multiple locations along the outer perimeter of the press coupler 400, or uniformly around the entire outer perimeter of the press coupler 400.

The compressive force is applied to an end section of the press coupler 400. When this occurs, a wall 420 of the end section is forced inward toward the conduit 410, thereby compressing a wall of the press coupler 400. Consequently, teeth 460 of the gripping ring 450 are driven against to deform a corresponding wall 470 of the conduit 410. For this to occur, the compressive force must exceed a threshold compressive force, which is defined by the strength of the conduit wall 470 of the conduit 410 relative to the strength of the teeth 460 of the gripping ring 450.

When one or more of the walls of the press coupler 400 are compressed and deformed by the application of a compressive force that exceeds the threshold compressive force, the gasket 430 also becomes compressed and deformed to form a seal against any vanishing threads present on the conduit 410, the separation ring 440 (present in this example), and the wall 420 of the press coupler 400. The separation ring 440 helps align the gasket 430 and/or compress the gasket 430 when the press coupler 400 is compressed and deformed. In certain example embodiments, the separation ring 440 can also prevent friction of the gasket 430 from introducing torque on the gripping ring 450 when compressed and deformed. By using the separation ring 440, the effectiveness of the deformation of the conduit 410 by the gripping ring 450 can be increased during compression and/or deformation of the press coupler 400.

As shown, the height of the separation ring 440 can be substantially the same as or less than the height of the gripping ring 450 plus teeth 460 when the press coupler 400 is in a compressed state. In this way, the separation ring 440 does not inhibit the press coupler 400 from creating a seal when the conduit 410 is compressed and deformed. Between the seal formed by the gasket 430 and the deformation or penetration of the conduit wall 470 by the gripping ring 450 and teeth 460, the conduit 410 is secured within the press coupler 400.

In certain example embodiments, the conduit wall 470 of the conduit 410, the gripping ring 450, and at least a portion of the press coupler 400 are electrically conductive (e.g., metallic). Thus, a solid grounding connection is made between the conduit 410 and the press coupler 400. In cases where an enclosure is made of an electrically conductive material, the enclosure can also be part of the solid grounding connection. This proper grounding is often required to meet applicable codes and/or standards for conduit, enclosed raceway, and/or wiring systems to reduce or eliminate the possibility of fires, explosion, overheating, and other adverse electrical conditions that can arise from improper grounding of wiring and related equipment.

The press coupler described herein can be used to couple an explosion-proof enclosure with a conduit in accordance with certain example embodiments. While the illustrated embodiments show specific configurations of components, it is to be appreciated that one or more may be omitted, added, repeated, and/or substituted. Accordingly, embodiments of conduit systems having example press couplers should not be considered limited to the specific arrangements of components shown herein.

In some cases, an enclosure is required to meet certain standards and/or regulations with respect to arresting flames and/or explosions. Such an enclosure can be called, for example, an explosion-proof enclosure or a flame-proof enclosure (generally called herein an explosion-proof enclosure). An explosion-proof enclosure is an enclosure that is configured to contain an explosion or flame that originates inside the enclosure or propagates to the enclosure. Further, an explosion-proof enclosure can be configured to allow gases from inside the enclosure to escape across joints of the enclosure and cool as the gases exit the enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface (as in this case for the traditional conduit receivers), and a serrated surface.

As mentioned above, an explosion-proof enclosure can be subject to meeting certain standards and/or requirements. For example, The National Electrical Manufacturers Association (NEMA) sets standards with which an enclosure must comply in order to qualify as an explosion-proof enclosure. Specifically, a NEMA Type 7 standard applies to enclosures constructed for indoor use in certain hazardous locations. Hazardous locations may be defined by one or more of a number of authorities, including but not limited to the NEC (e.g., Class 1, Division I) and Underwriters' Laboratories, Inc. (UL) (e.g., UL 1203). For example, a Class 1 hazardous area under the NEC is an area in which flammable gases or vapors may be present in the air in sufficient quantities to be explosive.

Traditional conduits and mating components have mating threads that, when coupled to complementary mating threads of a conduit, can allow the traditional coupling receiver to comply with such standards. Alternatively, when a conduit receiver is coupled to a conduit using coupling means other than mating threads, in order for an example press coupler to comply with such standards, a cemented joint is needed to eliminate the need for a machined flame-path. An example of a cemented joint is a sealing compound can be added to the cavity of the enclosure, at least in the portion of the cavity adjacent to where the press coupler is connected to the conduit. In such a case, the sealing compound can provide a barrier between the explosion-proof side of the cavity and the non-explosion-proof side of the cavity.

The systems and methods described herein may provide several advantages including a significant savings in time and material for installing, modifying, and/or maintaining a conduit system. This allows for less costly, easier, and quicker installation of conduit systems using example press couplers. Example embodiments also provide more flexibility in where enclosures having example press couplers are located in a conduit, enclosed raceway, and/or wiring system. Certain example embodiments provide a number of other benefits, as well, including but are not limited to simplified installation, simplified inspection, simplified maintenance, and reduced cost. For example, the labor associated with installing enclosed raceways that have threaded conduit and fittings (as in the current art) is higher than other portions of a cabling systems, such as cable tray and laying cable without cable tray or conduit. When enclosed raceways are used, example embodiments allow for lower the labor cost and time for installing enclosed raceways.

In addition, using a press connection of an example conduit receiver as opposed to mating threads, the enclosure to which the press connection is affixed and/or coupled to can rotate, eliminates the need for a union or similar component in a conduit system. Again, this simplifies installation, saves time, money and materials, and allows for increased flexibility in designing, installing, modifying, and/or maintaining a conduit system. Further, conduit can have a coating (e.g., zinc oxide) to protect the conduit (and the mating threads in particular) from corrosion. The NEC requires that where corrosion protection is necessary and conduit is threaded in the field, the threads should be coated with an approved electrically-conductive, corrosion resistant compound. When a conduit is cut to size and new mating threads are etched into the conduit, those new mating threads are not protected from corrosion because the new mating threads do not have the coating. Example embodiments allow conduit to be cut to size and still be protected from corrosion because no etchings that can remove the coating are made to the conduit.

In addition, example embodiments help to protect the integrity of a flame path when example conduit receivers are part of an explosion-proof system. Since new mating threads do not need to be etched into a conduit, such as when a conduit is cut to a shorter length, burrs and shavings are not created, and so cannot interfere with a flame path defined by such mating threads. Further, regardless of whether an example conduit receiver is part of an explosion-proof system, the burrs and shavings that would otherwise be generated to etch mating threads do not risk the integrity of an electrical cable by scraping and/or puncturing the jacket of an electrical cable. In other words, example embodiments are free of metal burrs, metal shavings, and other objects that could scrape or puncture the jacket of an electrical cable pulled through and/or disposed within an example conduit receiver.

The example embodiments herein overcome the following disadvantages of a threaded system: the amount of wall lost during threading can be up to 55% of the original conduit wall; vibration can result in fatigue failures of threaded joints due to the high stress intensification effects caused by the sharp notches on the base of the threads; and in hazardous or explosion-proof areas, thread flame-paths should be minimized as their vulnerability to fatigue damage is significant, especially where exposed threads are subject to corrosion.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. An electrical conduit system for use in a hazardous location comprising:
   a press coupler, the press coupler comprising:
      a first end portion and a second end portion;
      a first intermediate portion and a second intermediate portion; and
      a central portion;
   a conduit having a distal end positioned within the first end portion and the first intermediate portion of the press coupler, the distal end being one of threaded or non-threaded; and
   electrical wiring provided through the conduit and the press coupler;
   wherein the press coupler is configured such that it is capable of receiving either the threaded or non-threaded distal end and includes a stop formed in the central portion of the press coupler, wherein the stop contacts the threaded or non-threaded distal end of the conduit, and
   wherein the first end portion of the press coupler includes: at least one projection that engages a wall of the conduit; and a gasket, the gasket being positioned within the first end portion such that when the distal end of the conduit is threaded, the gasket seals upon vanishing threads on the distal end.

2. The electrical conduit system of claim 1, wherein the at least one projection engages a non-threaded portion of the wall of the conduit.

3. The electrical conduit system of claim 1, wherein the press coupler includes a first gripping ring positioned within the first end portion and a second gasket and a second gripping ring positioned within the second end portion.

4. The electrical conduit system of claim 3, wherein the at least one projection projects from an inner diameter of the first gripping ring.

5. The electrical conduit system of claim 1, further comprising a first gripping ring positioned within the first end portion of the press coupler, the first gripping ring having a first material hardness, and wherein the conduit has a second material hardness, the first material hardness being greater than the second material harness.

6. An electrical conduit system for use in a hazardous location comprising:
   a conduit having a first end and a second end, wherein at least one of the first end and the second end includes external threads; and
   a press coupler, the press coupler comprising:
      first and second open portions, each having a first uniform inner diameter;

first and second intermediate portions, each having a second uniform inner diameter, the second uniform inner diameter corresponding to an outer diameter of the first end and the second end of the conduit;

a central portion having a third uniform inner diameter, the third uniform inner diameter sized to be less than the outer diameter of the first end and the second end of the conduit;

a gasket; and a gripping portion, and wherein the gasket seals upon a vanishing thread of the external threads of the conduit when a diameter of the press coupler is compressed against the conduit.

7. The electrical conduit system of claim 6, wherein the conduit, the press coupler, and the gripping portion of the press coupler are metallic.

8. The electrical conduit system of claim 6, wherein a material hardness of the gripping portion is greater than a material hardness of the conduit.

9. The electrical conduit system of claim 6 further comprising electrical wiring extending through an internal diameter of the conduit and the press coupler.

10. The electrical conduit system of claim 6 further comprising a separation ring positioned between the gasket and the gripping portion.

11. The electrical conduit system of claim 6, wherein the gripping portion comprises a gripping ring having at least one tooth projecting from an internal diameter of the gripping ring.

12. The electrical conduit system of claim 6, wherein the gripping portion includes a plurality of spaced apart teeth configured to engage a wall of the conduit.

13. An electrical conduit system for a hazardous location comprising:

a conduit having a first end and a second end, wherein at least one of the first and second ends is externally threaded; and a press coupler, the press coupler comprising:

a first end portion and a second end portion;

a first intermediate portion and a second intermediate portion;

a central portion positioned between the first intermediate portion and the second intermediate portion;

a first gasket and a first gripping portion positioned within the first end portion; and a second gasket and a second gripping portion positioned within the second end portion, and wherein at least one of the first gasket and the second gasket seals upon a vanishing thread of the at least one externally threaded end of the conduit when the press coupler is compressed against the conduit, wherein the central portion provides a stop for the first end or the second end of the conduit, wherein a material hardness of the gripping portion is greater than a material hardness of the conduit, wherein the first end portion and second portions of the press coupler are a malleable material capable of compression, and wherein a grounding connection is formed between the conduit, the press coupler, and at least one of the first gripping portion and the second gripping portion.

* * * * *